June 12, 1956  W. R. CARLSEN  2,749,802
SHAVING CUTTER FOR GEARS

Filed Sept. 30, 1952  2 Sheets-Sheet 1

INVENTOR.
William R. Carlsen.
BY
Harness, Dickey & Pierce.
ATTORNEYS.

June 12, 1956 W. R. CARLSEN 2,749,802
SHAVING CUTTER FOR GEARS
Filed Sept. 30, 1952 2 Sheets-Sheet 2

INVENTOR.
William R. Carlsen
BY
Harness, Dickey & Pierce
ATTORNEYS.

United States Patent Office 2,749,802
Patented June 12, 1956

2,749,802
SHAVING CUTTER FOR GEARS

William R. Carlsen, Huntington Woods, Mich., assignor to Michigan Tool Company, Detroit, Mich., a corporation of Delaware Application September 30, 1952, Serial No. 312,274

4 Claims. (Cl. 90—1.6)

This invention relates to shaving cutters for gears, and especially to machines for shaving tooth forms on relatively large herringbone and similar helical gears.

It is an object of the invention to provide an improved device for finishing tooth forms on relatively large gears by the well known crossed-axis tooth shaving method, the device having a vertically movable shaving cutter head and means for rotating the work on a vertical axis, whereby relatively heavy gears may be finished and the construction of the work supporting means is greatly simplified.

It is another object to provide an improved device of the above character, which is especially adapted for shaving herringbone or similar helical gears in such a manner that both sides of the herringbone gear are finished simultaneously.

It is also an object to provide a device of the above character which comprises two shaving cutter heads independently rotatable on separate axes and capable of independent adjustment in a vertical direction, whereby the heads may be adjusted for shaving gears of different face widths.

It is a further object to provide a gear shaving machine of the above character, in which at least one of the cutter heads is adjustable relative to the other in the direction of tooth depth, thereby compensating for the reduction in effective diameter which results when one of the cutters is sharpened and assuring that the two cutters serve with equal cutting pressures at all times.

Other objects, features and advantages of the present invention will become apparent from the subsequent description, taken in conjunction with the accompanying drawings.

Figure 1:
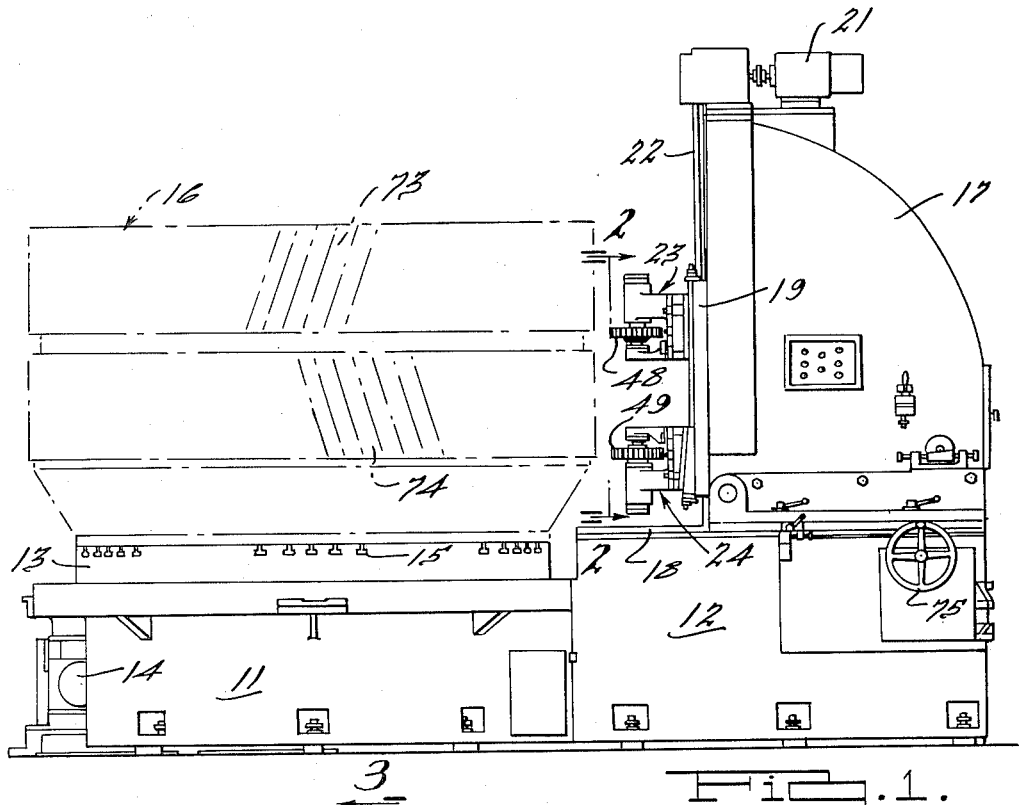
Figure 1 is a side elevational view of the improved machine of this invention, showing a gear on the work table and the cutting head carrier in its lowermost position, the cutter heads being shown before their angular positioning for purposes of clarity.

The machine comprises a base 11 for the work table and an adjoining base 12 for the cutter head carriage. The work table 13 surmounting base 11 is rotatable about a vertical axis, being driven by motor 14, and the work table has the conventional slots 15 which retain the clamping means for the work, shown in dot-dash lines as a relatively large herringbone gear generally indicated at 16. The base 12 carries a work carriage 17 which is horizontally slidable on ways 18 toward and away from the work. Mounted for vertical sliding movement on the side of carriage 17 facing the work is a cutting head slide 19, which is driven by a motor 21 through lead screw 22. It will be understood that additional means (not shown) for driving the slide 19 at different speeds may be provided. The arrangement is therefore such that during the shaving operation the cutter heads described below may be reciprocated between the end faces of the gear 16, and at the same time may be fed inwardly toward the work.

Figure 2:
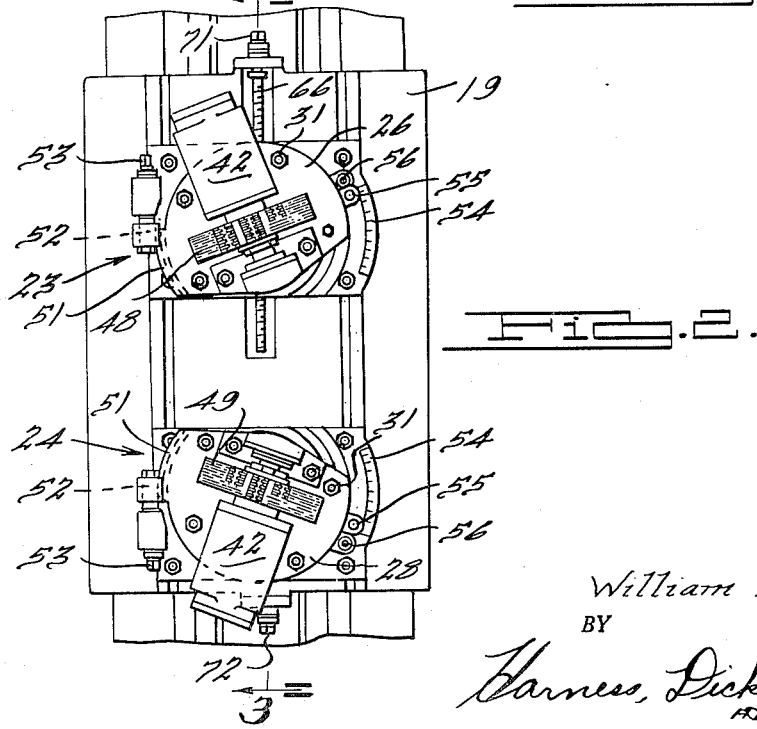
Figure 2 is a front elevational view of the cutter head carrier, taken along the line 2—2 of Figure 1 but showing the angular positioning of the cutter heads.
Figure 3:
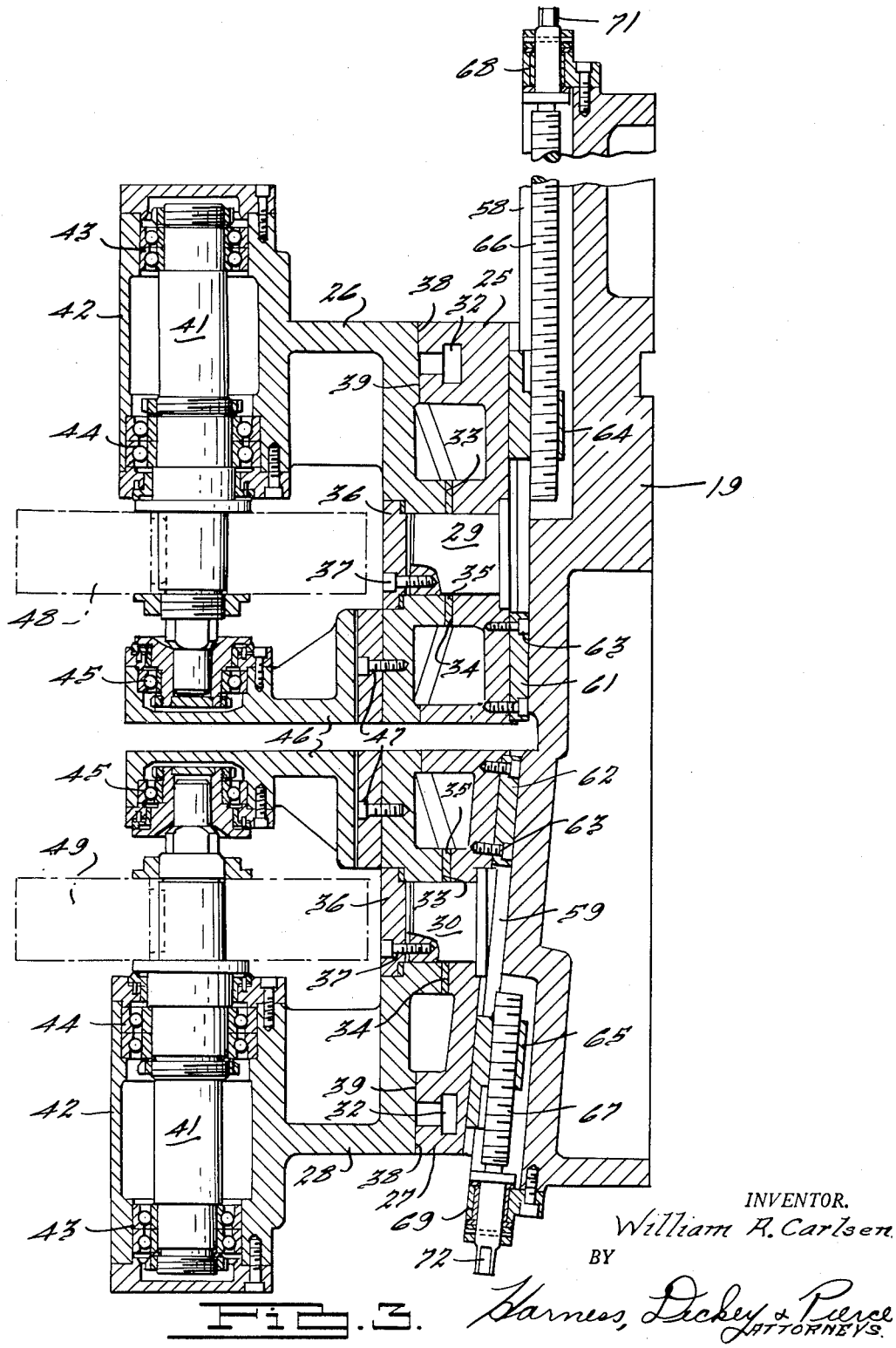
Figure 3 is a cross-sectional view taken along the line 3—3 of Figure 2 and showing the adjusting means for the cutter heads, but with the heads in their zero angular position as shown in Figure 1.

The cutter head slide 19 carries a pair of cutter heads indicated generally at 23 and 24. As seen best in Figures 2 and 3, the upper cutting head 23 comprises a base portion 25 and a head portion 26, and the lower cutting head 24 comprises a base portion 27 and a head portion 28. The head portions of the two cutters are identical in construction and are rotatably secured to the respective base portions by means of a pivot pin 29 in base 25, a pivot pin 30 in base portion 27, and retaining pins 31 slidable in arcuate slots 32 having T-shaped cross-sections. Each head portion has a bearing surface 33 which is separated from a corresponding bearing surface 34 on its corresponding head portion by a bearing washer 35. A shouldered retaining member 36 is secured to each pivot pin by a screw 37 and serves to hold each head portion to its corresponding base portion. Each head portion also has a bearing surface 38 engageable with a corresponding bearing surface 39 on its corresponding base portion. It will therefore be seen that the head portions 26 and 28 are independently rotatable on their respective base portions 25 and 27, so that the angles of the cutter heads may be adjusted to the particular angles of the helical gear teeth. Figure 2 shows the shaving heads set for cutting both sides of a herringbone gear simultaneously, the heads being set in opposite directions. If desired, the cutting heads could be set for shaving one helix at a time by setting the heads in parallel relation.

The cutter spindles 41 are mounted in identical manner for rotation in their respective heads 26 and 28. In particular, each head has a bearing housing portion 42 which holds a pair of radial anti-friction bearings 43 and a pair of thrust bearings 44. Bearings 43 and 44 support one side of spindle 41, the other side being supported by a bearing 45 on each of the cutter heads. Bearing 45 is supported by a bearing stand 46 on each cutter head, secured thereto by screws 47. Due to the fact that the shorter ends of spindles 41 are directed toward each other, it is possible to bring the cutter heads 23 and 24 relatively close to each other, so that the upper shaving cutter 48 and the lower shaving cutter 49 can be in closely adjacent relation.

Means are provided for rotatably adjusting the cutting heads, and this means is substantially identical on each of the heads. A gear segment portion 51 is integral with each of the head portions 26 and 28, and a worm 52 is rotatably mounted on each of the base portions 25 and 27 and meshes with the gear sector. By manually rotating shaft 53 of each worm, the corresponding cutter head may be angularly adjusted. A scale 54 is preferably provided on each cutter head base portion, and a combination indicator and gage pin 55 on each head portion cooperates therewith. A gage pin 56 is used in conjunction with gage pin 55 when crossed axis settings are made with gage blocks.

Referring now more particularly to the mounting of the base portions 25 and 27 on the cutter head slide 19, the slide is provided with sliding ways 58 for upper cutting head 23 and sliding ways 59 for lower cutting head 24. As seen best in Figure 3 ways 58 are considerably longer than ways 59, and the latter is at an inclination to the direction of reciprocation of slide 19, whereas ways 58 are parallel to this direction of reciprocation. In order to have the axes of both spindles 41 movable in planes parallel to the direction of reciprocation of the slide, base portion 27 is constructed in a tapered manner, so that when it is adjusted in its ways 59, spindle 41 of cutting head 24 moves parallel to itself. To retain the cutting heads on the ways, base portions 25 and 27 are provided with guide blocks 61 and 62 respectively, retained by the ways and secured to the base portions by screws 63. Also fixed to base portions 25 and 27 are nut members 64 and 65 respectively which also act as guide blocks, these members cooperating with lead screws 66 and 67. Lead screw 66 is considerably longer than lead screw 67, and bearing supports 68 and 69 are provided at opposite ends of the slide for rotatably supporting the lead screws. The screws may be rotated by hand, being provided with tool receiving portions 71 and 72.

In operation, the gear 16 to be shaved will first be secured to rotatable bed or work table 13. Upper cutting head 23 will then be adjusted relative to lower cutting head 24, by rotating lead screw 66. This adjustment is to adapt the cutting heads for shaving both sides of the herringbone gear simultaneously, or to cut one side at a time if desired. As shown in Figure 1, the cutting heads 23 and 24 are shown in a spaced-apart condition for cutting the upper set of teeth 73 and lower set 74 on herringbone gear 16, and in the illustration, slide 19 is shown in its lowermost position. It will be apparent from viewing Figure 1 that when the slide 19 is reciprocated, cutting head 24 will move across lower teeth 74, while upper cutting head 23 will move across the upper set of teeth 73 and that when properly adjusted, the two heads will simultaneously shave the entire length of both sets of teeth.

The cutting heads are also rotatably adjusted so as to achieve the crossed-axis relation which is necessary in the gear shaving process. As shown in Figure 2, the upper head 23 is rotated counterclockwise from its midposition and the lower head 24 rotated clockwise from its midposition. It will be understood that if it were desired to cut only one set of the herringbone gear teeth at a time, the cutting heads could be rotatably adjusted so as to have the cutter spindles in parallel relation.

As the next step the lead screw 67 is rotated so as to adjust cutter 49 in a direction normal to the direction of reciprocation of slide 19, so as to equalize the shaving pressures of cutters 48 and 49. Carriage 17 may then be moved toward the work, by such means as hand wheel 75, and the shaving operation is begun. During the operation the gear 16 is rotated by motor 14, and the motor 21 reciprocates slide 19 in a vertical direction, carriage 17 also being moved slowly inwardly toward the work as the shaving continues.

In the usual gear shaving operation, it will become necessary at various times to sharpen either or both of the cutters 48 or 49. When this is done, the effective diameter of the sharpened cutter is reduced. This means that if the positions of both spindles 41 relative to the work axis were unchanged, the cutting pressures of the two cutters would become unequal. To compensate for this occurrence, lead screw 67 may be rotated in one direction or the other after sharpening either of the cutters 48 and 49. The axis of lower spindle 41 may thus be brought closer or further away from the work axis, and the cutting pressures of the two shaving cutters equalized. If necessary, the position of the spacing of cutters 48 and 49 in a vertical direction may be readjusted, after the adjustment of lead screw 67, by rotating lead screw 66, thus maintaining the desired spacing of the cutters.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a device for shaving gears, a work holding member adapted to support a gear, means for rotating said work holding member, a cariage adjustable toward and away from said gear, a slide mounted on said carriage, means for moving said slide in a direction parallel to the gear axis, a pair of shaving cutter heads on said slide, means on each of said heads for rotatably supporting a shaving cutter spindle, means for angularly adjusting each of said spindles with respect to the direction of movement of said slide, means for longitudinally adjusting one of said shaving cutter heads with respect to said slide, and means for adjusting said other shaving cutter head in a direction normal to the gear axis, said last-mentioned means including a track forming part of said slide and inclined with respect to the direction of movement of said slide, said other shaving cutter head being held by said inclined track.

2. In a device for shaving gears, a vertically movable slide, a pair of shaving cutter heads supported by said slide, means on each of said heads for rotatably supporting a shaving cutter spindle, means for angularly adjusting each of said spindles with respect to the direction of movement of said slide, slidable supporting means for one of said shaving cutter heads, said slidable supporting means including a track forming part of said slide and permitting movement of said head on said slide in the dircetion of movement of said slide, and slidable supporting means for the other shaving cutter head, said last-mentioned slidable supporting means including a second track forming part of said slide, said second track being relatively shorter than said first-mentioned track and being inclined relative thereto, whereby said second shaving cutter head may have a combined adjusting movement in directions both parallel to and normal to the direction of movement of said slide.

3. In a device for shaving gears, a work holding member adapted to support a gear for rotation about a vertical axis, means for rotating said work holding member, a carriage adjustable toward and away from said gear, a slide mounted on said carriage, means for moving said slide in a vertical direction, a pair of shaving cutter heads supported by said slide, each of said heads having a base portion and a head portion, means on each head portion for rotatably supporting a shaving cutter spindle, means for rotatably adjusting each head portion relative to its base portion whereby each shaving cutter may be angularly adjusted with respect to the direction of movement of said slide, retaining means preventing axial movement between the head and base portions of each shaving cutter head, a track forming part of said slide and supporting one of said shaving cutter heads for movement in a direction parallel to the direction of movement of said slide, a second track forming part of said slide and inclined with respect to said first track, said second shaving cutter head being held by said inclined track, and means for independently adjusting each of said shaving cutter heads in its corersponding track, whereby the relative positions of said shaving cutter heads may be adjusted in directions both parallel to and normal to the direction of movement of said slide.

4. In a device for shaving gears, a movable slide, a pair of shaving cutter heads, each of said heads having a base portion and a head portion, means on each head portion for rotatably supporting a shaving cutter spindle, means for rotatably adjusting each head portion relative to its base portion whereby each shaving cutter may be angularly adjusted with respect to the direction of movement of said slide, retaining means preventing relative axial movement between the head and base portions of each shaving cutter head, a track forming part of said slide and supporting one of said shaving cutter heads for movement in a direction parallel to the direction of movement of said slide, a second track forming part of said slide and inclined with respect to said first track, said second shaving cutter head being held by said inclined track, and means for independently adjusting each of said shaving cutter heads in its corresponding track, whereby the relative positions of said shaving cutter heads may be adjusted in directions both parallel to and normal to the direction of movement of said slide.

References Cited in the file of this patent

UNITED STATES PATENTS

| | | |
|---|---|---|
| 2,227,491 | Drummond | Jan. 7, 1941 |
| 2,556,142 | McLeod | June 5, 1951 |